(12) United States Patent
Bronsthein

(10) Patent No.: US 9,906,032 B2
(45) Date of Patent: Feb. 27, 2018

(54) ELECTRICAL ENERGY TRANSMISSION SYSTEM

(71) Applicant: GB Energy LLC, Bay Harbor Islands, FL (US)

(72) Inventor: Alexander Bronsthein, Beer-Sheva (IL)

(73) Assignee: GB ENERGY LLC, Bay Harbor Islands, FL (US)

( * ) Notice: Subject to any disclaimer, the term of this patent is extended or adjusted under 35 U.S.C. 154(b) by 406 days.

(21) Appl. No.: 14/749,321

(22) Filed: Jun. 24, 2015

(65) Prior Publication Data

US 2016/0380432 A1    Dec. 29, 2016

(51) Int. Cl.
*H02J 3/26* (2006.01)
*H02K 47/30* (2006.01)
*H02J 3/10* (2006.01)
*H02M 5/32* (2006.01)
*H02M 5/14* (2006.01)

(52) U.S. Cl.
CPC ............. *H02J 3/26* (2013.01); *H02J 3/10* (2013.01); *H02K 47/30* (2013.01); *H02M 5/14* (2013.01); *H02M 5/32* (2013.01)

(58) Field of Classification Search
CPC .. H02J 3/26; H02J 3/10; H02K 47/30; H02M 5/14; H02M 5/32
USPC ........... 307/14, 147, 148; 358/167; 363/153, 363/154
See application file for complete search history.

(56) References Cited

U.S. PATENT DOCUMENTS

| | | | |
|---|---|---|---|
| 2010/0217546 A1* | 8/2010 | Locker ................... | G01R 19/06 702/58 |
| 2013/0286697 A1* | 10/2013 | Eiland ....................... | H02J 3/26 363/71 |

* cited by examiner

*Primary Examiner* — Arnold Kinkead
(74) *Attorney, Agent, or Firm* — Henry M. Feiereisen LLC

(57) ABSTRACT

An electrical energy transmission system has a three-phase electric current power source generating a three-phase current including three currents of different phases, a three-phase current converting device which converts at least some of the currents, a single-wire electric current transmission line configured to transmit the converted currents to a consumer, and a balancing device configured to balance the electric currents in the three-phase current source and providing thereby a stable operation of the three-phase current power source.

7 Claims, 1 Drawing Sheet

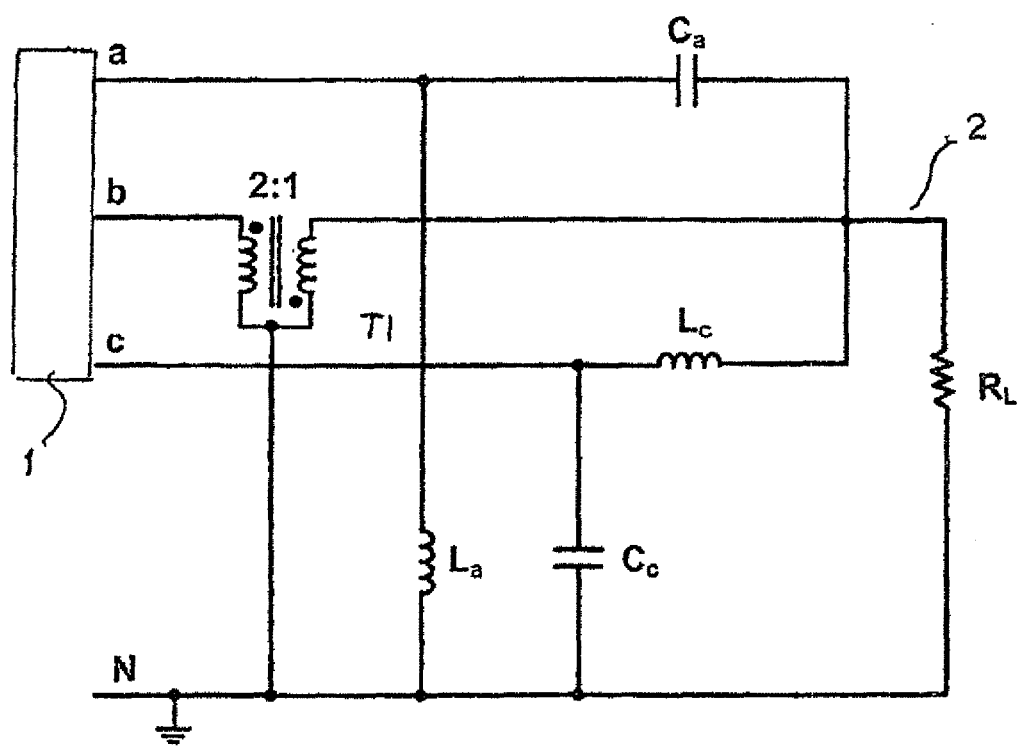

ELECTRICAL ENERGY TRANSMISSION SYSTEM

BACKGROUND OF THE INVENTION

Field of the Invention

The present invention relates to the field of electrical systems. More particularly, the invention relates to electrical energy transmission systems which are used to transmit electrical energy generated by three-phase electric power sources over certain distances, including significantly long distances.

Background Art

An electrical energy transmission system for transmitting a generated three-phase current conventionally includes a three-phase electrical power generator and an electrical transmission line which transmits the generated electrical energy to a load.

There were attempts to carry out the electrical energy transmission by means of one wire. First applications of the single-wire electrical energy transmission were disclosed by Nikola Tesla in U.S. Pat. No. 1,119,736 and in British Patent No. 8,200. Another single line transmission technique is known as the Goubau line or G-line, which is a type of single wire transmission line used at UHF and microwave frequencies (see Geog Goubau, "Surface waves and their Application to Transmission Lines," Journal of Applied Physics, Volume 21, November, 1950). However, a G-line is a type of waveguide, rather than a wire for an electric circuit. There was also an experiment based on the Russian patent application by Stanislav and Konstantin Avramenko {6-8}. All these concepts were based on signal processing, including frequency converting or signal straightening. They however negatively influence the process of transmission of electrical energy and lead to loss of power.

Also an electrical energy distribution method is known with the use of one conductor, however with a return of the electrical current through earth, according to the authors of the proposed method. This method is known as the Single Wire Earth Return (SWER). However, the simplification of the electrical energy transfer in this system is achieved due to the loss of a part of the power produced by the source due to the distance.

Three phase electrical energy transmission systems, in which conventionally electrical energy is transmitted by four wires has significant advantages. However, the presence of three or four wires is not the only drawback of the system. Another drawback is a line voltage between two wires in this system at the root of the three phase voltage. This may have negative consequences, such a corona effect and additional losses in the lines. Additional disadvantage of the three phase system is the need to arrange the wires at a distance of several meters from each other. This in turn makes difficult to use underground lines.

A further improvement to provide an electrical energy transmission system, which transmits electrical energy generated by a three-phase electrical power source is disclosed in U.S. patent application Ser. No. 14/555,951. An electrical energy transmission system disclosed in this patent application comprises a three-phase electric current power source or generator generating a three-phase electric current signal including three currents having different phases, a three-phase electric current signal converting device connected with said three-phase electric current source and converting the three-phase electric current signal generated by the latter, and a single-wire electrical energy transmission line connected with said converting device and transmitting further at least a part of the converted three-phase electric current signal. The electrical energy transmission system designed this way allows a transmission of at least a part of the three-phase electric current signal through the single-wire transmission line, which results in significant economy of wires, especially in the systems which carry out transmission of electrical energy generated by three-phase electrical power sources over significant distances.

It has been however determined that the electrical current transmission system constructed as specified hereinabove cause a disbalance of currents in the three-phase electric current generator, which negatively affect the operation of the three-phase electric current generator. Therefore is the electrical current transmission system must be further improved to prevent a stable operation of the three-phase electric current generator.

SUMMARY OF THE INVENTION

Accordingly it is an object of the present invention to provide an electrical current transmission system with a conversion of at least a part of a three-phase electric signal generated by a three-phase electric current power source or a generator, in which a stable operation of the three-phase electric current generator is provided.

In keeping with these objects and with others which will become apparent hereinafter, one feature of the present invention resides, briefly stated, in an electrical energy transmission system, comprising a three-phase electric current power source generating a three-phase electric current signal including three currents having different phases, a three-phase electric current signal converting device which converts the generated three-phase electric current signal, a single-wire electrical energy transmission line which transmits the converted electric current signal, and means for balancing electric currents in the three-phase electric current source and providing thereby a stable operation of the latter.

In accordance with another feature of the present invention, the means for balancing electric currents in the three-phase electric power source include an inductance and a capacitance provided in corresponding lines through which currents of the three-phase current are transmitted.

In accordance with a further feature of the present invention the inductance is connected between the wire or line transmitting one current in one phase and the wire or line extending from a load or consumer, while the capacitance is connected between the wire or line transmitting another current in another phase and the wire or line extending from the load or consumer.

The novel feature of the present invention are set forth in particular in the appended claims.

The invention itself, both as to its construction and its manner of operation, will be best understood from the following description of preferred embodiments, which is accompanied by the following drawings.

BRIEF DESCRIPTION OF THE DRAWINGS

FIG. 1 of the drawings is a view schematically showing a system for transmission of electrical energy generated by a three-phase electric current power source according to the present invention.

DETAILED DESCRIPTION OF THE INVENTION

An electrical energy transmission system according to the present invention includes a three-phase electric current power source or electrical generator which is identified as a whole with reference numeral 1 and is designed to transmit electrical energy to a consumer or an active load Rl through a single wire transmission line 2. The three-phase electric current power source generates three-phase electric current including three currents transmitted correspondingly through three wires or lines a, b, c.

In order to transmit the three currents of the three-phase electric current, which currents have different phases that are offset from one another by 120 degrees, a converting device is provided in the electrical energy transmission system of the invention. The converting device includes a capacitance Ca arranged in the line a, a transformer T1 arranged in line b, and a capacitance Cc arranged in the line c. The converting device including the components Ca, T1, Cc changes the phases of at least some of the three currents, so that the current become arranged in a single phase and are transmitted through the single wire or line to the consumer or load Rl.

The windings of the transformer T1 are connected inversely. Its primary winding is connected between the line or phase b and a neutral, while its secondary winding is connected between a joint output point 3 of the currents and the neutral. Voltages in the windings of the transformer T1 are in a counterphase, they are shifted by 180 degrees relative to one another.

In the known electrical energy transmission system one current of a three-phase current is shifted by +60° in the line a, another current is shifted by −60° in the line c, so that the three currents in lines a, b, c have the same phase and are transmitted through the single line. This however cause a disbalance in the three-phase current power source.

According to the present invention, the system includes means for balancing of electric current in the three-phase electric current source. The balancing means include an inductance La which is connected with the line a and a line coming back from the consumer. In this manner it adds inductance current to the voltage source Va without affecting the voltage, and compensates a phase shift in the current of the line or phase a of the three-phase current source 1, which phase shift is cased in the current of line or phase a cause by the capacitance Ca.

The balancing means further include a capacitance Cc which is connected between the line c and the line extending back from the consumer. In this manner it adds capacitance current to the voltage source Vc without affecting the voltage and compensates a phase shift in the current of the line or phase c of the three-phase current source 1, which phase shift is caused by the inductance Lc.

The capacitance Cc and the inductance La provide a balancing of currents in the three-phase current source 1 and create conditions for its stable operation, including a maintenance of phases with an offset by 120 degrees and equal amplitudes of currents of the three-phase current source or generator 1.

The present invention is not limited to the details shown, since various modifications and structural changes are possible without departing in any way from the spirit of the invention.

What is desired to be protected by Letters Patent is set forth in particular in the appended claims.

The invention claimed is:

1. An electrical energy transmission system comprising:
   a three-phase electric current power source generating a three-phase electric current including three currents having different phases;
   a single consumer configured to receive an electric current in a single phase;
   a three-phase electric current converting device configured to convert the generated three-phase electric current so as to change the phases of at least some of the three currents to obtain a converted current in a single phase;
   a single-wire electrical energy transmission line configured to transmit the converted three-phase electric current signal in the single phase to the single consumer configured to receive an electric current in the single phase; and
   means for balancing the electric current in the three-phase electric current source and providing thereby a stable operation of the three-phases current source, including maintenance of phases with an offset by 120 degrees and equal amplitudes of currents of the three-phase electric current source during the transmission to the single-wire electrical transmission line and to the single consumer receiving the electric current in the single phase.

2. An electrical energy transmission system of claim 1, wherein the balancing means include a first means provided in a first line through which one of the currents is transmitted, and a second means provided in a second line through which another of the currents is transmitted.

3. An electrical energy transmission system of claim 2, wherein said first means includes an inductance.

4. An electrical energy transmission system of claim 3, wherein said inductance is provided between the first line and a line configured to extend from the consumer.

5. An electrical energy transmission system of claim 2, wherein said second means includes a capacitance.

6. An electrical energy transmission system of claim 5, wherein said capacitance is connected between the second line and a line configured to extend from the consumer.

7. An electrical energy transmission system of claim 2, wherein said first means includes an inductance connected with the first line, and a capacitance connected with the second line.

* * * * *